(12) United States Patent
Bray et al.

(10) Patent No.: US 8,109,329 B2
(45) Date of Patent: Feb. 7, 2012

(54) SPLIT-COIL, REDUNDANT ANNULAR COUPLER FOR WIRED DOWNHOLE TELEMETRY

(75) Inventors: Jeff Bray, Mapleton, UT (US); David Bartholomew, Springville, UT (US)

(73) Assignee: Intelliserv, L.L.C., Houston, TX (US)

( * ) Notice: Subject to any disclaimer, the term of this patent is extended or adjusted under 35 U.S.C. 154(b) by 452 days.

(21) Appl. No.: 12/354,124

(22) Filed: Jan. 15, 2009

(65) Prior Publication Data

US 2010/0175890 A1 Jul. 15, 2010

(51) Int. Cl.
*E21B 47/12* (2012.01)
(52) U.S. Cl. .................................. 166/65.1; 340/855.1
(58) Field of Classification Search .............. 166/65.1, 166/66.5; 285/333; 439/191; 340/854.8
See application file for complete search history.

(56) References Cited

U.S. PATENT DOCUMENTS

| | | | |
|---|---|---|---|
| 6,392,317 B1 | 5/2002 | Hall et al. | |
| 6,670,880 B1 | 12/2003 | Hall et al. | |
| 6,844,498 B2 | 1/2005 | Hall et al. | |
| 6,866,306 B2* | 3/2005 | Boyle et al. | 285/333 |
| 6,929,493 B2* | 8/2005 | Hall et al. | 439/191 |
| 6,992,554 B2 | 1/2006 | Hall et al. | |
| 7,040,003 B2 | 5/2006 | Hall et al. | |
| 7,041,908 B2 | 5/2006 | Hall et al. | |
| 7,096,961 B2 | 8/2006 | Clark et al. | |
| 7,180,825 B2 | 2/2007 | Shah et al. | |
| 7,193,527 B2 | 3/2007 | Hall et al. | |
| 7,198,118 B2 | 4/2007 | Hall et al. | |
| 7,248,177 B2* | 7/2007 | Hall et al. | 340/854.8 |
| 7,277,026 B2 | 10/2007 | Hall et al. | |
| 7,336,199 B2 | 2/2008 | Lasater et al. | |
| 7,362,235 B1 | 4/2008 | Normann et al. | |
| 7,382,273 B2 | 6/2008 | Hall et al. | |
| 7,468,678 B2 | 12/2008 | Shah et al. | |
| 2002/0135179 A1 | 9/2002 | Boyle et al. | |
| 2004/0145492 A1 | 7/2004 | Hall et al. | |
| 2004/0150533 A1 | 8/2004 | Hall et al. | |
| 2005/0212530 A1 | 9/2005 | Hall et al. | |
| 2005/0230149 A1 | 10/2005 | Boucher et al. | |
| 2006/0151179 A1* | 7/2006 | Boyadjieff et al. | 166/380 |
| 2006/0225926 A1 | 10/2006 | Madhavan et al. | |

(Continued)

FOREIGN PATENT DOCUMENTS

WO    WO 2008/027047 A1    3/2008

OTHER PUBLICATIONS

PCT International Search Report and Written Opinion for Appl. PCT/US2010/021137 dated Aug. 31, 2010; (7 p.)

*Primary Examiner* — Daniel P Stephenson
(74) *Attorney, Agent, or Firm* — Conley Rose, P.C.

(57) ABSTRACT

An annular coupler for transmitting data across a tool joint may include a first coupler segment spanning a first portion of the circumference of the annular coupler. The annular coupler may further include a second coupler segment, electrically insulated from the first coupler segment, which spans a second portion of the circumference of the annular coupler. In selected aspects, the first and second portions do not overlap one another along the circumference. In certain aspects, the first and second coupler segments each span about fifty percent of the circumference of the annular coupler. Thus, each coupler segment may make up roughly half of the annular coupler.

36 Claims, 6 Drawing Sheets

U.S. PATENT DOCUMENTS

| | | |
|---|---|---|
| 2006/0260798 A1 | 11/2006 | Hall et al. |
| 2007/0030167 A1 | 2/2007 | Li et al. |
| 2007/0994948 | 8/2007 | Hall et al. |
| 2008/0007425 A1 | 1/2008 | Hall et al. |
| 2008/0012569 A1 | 1/2008 | Hall et al. |
| 2008/0110638 A1 | 5/2008 | Hall et al. |
| 2008/0251247 A1 | 10/2008 | Flint et al. |
| 2009/0058675 A1* | 3/2009 | Sugiura ............... 340/854.8 |
| 2010/0071188 A1* | 3/2010 | Madhavan et al. .......... 29/428 |

* cited by examiner

SPLIT-COIL, REDUNDANT ANNULAR COUPLER FOR WIRED DOWNHOLE TELEMETRY

BACKGROUND

1. Field of the Invention

This invention relates to downhole drilling, and more particularly to apparatus and methods for transmitting data along a downhole drill string.

2. Description of the Related Art

For half a century, the oil and gas industry has sought to develop downhole telemetry systems that enable high-definition formation evaluation and borehole navigation while drilling in real time. The ability to transmit large amounts of sub-surface data to the surface has the potential to significantly decrease drilling costs by enabling operators to more accurately direct the drill string to hydrocarbon deposits. Such information may also improve safety and reduce the environmental impacts of drilling. This technology may also be desirable to take advantage of numerous advances in the design of tools and techniques for oil and gas exploration, and may be used to provide real-time access to data such as temperature, pressure, inclination, salinity, and the like, while drilling.

In order to transmit data at high speeds along a drill string, various approaches have been attempted or suggested. One approach that is currently showing promise is to incorporate a "network" of data transmission cable and other communication equipment into the drill string. Due to the length of drill strings, which may exceed 20,000 feet, such a network may require placing network "nodes" at selected intervals along the drill string. These nodes may act as repeaters to amplify the data signal and provide points of data collection along the drill string. Communication elements, such as magnetic couplers, may be incorporated into the ends of downhole tools to transmit data across the tool joints. Transmission lines, such as electrical cables, may be incorporated into the downhole tools to transmit data therealong.

Unfortunately, unlike conventional above-ground networks, a downhole network is constrained by the physical limitations of the downhole drill string. In particular, a downhole drill string is a linear structure, making it very difficult to build redundancy (and thereby reliability) into the downhole network. As a result, any break or malfunction in the data transmission path along the drill string may cause communication to be lost between the surface and downhole components. Because the drill string may include many hundreds of downhole components (e.g., sections of drill pipe, drill collar, bottom-hole assembly components, etc.), a single break or malfunction in any downhole component can break the communication path and cause the network to lose much if not all of its functionality.

In view of the foregoing, what are needed are apparatus and methods to provide multiple redundant paths of communication in a downhole network. Such apparatus and methods may be used to significantly improve the reliability of downhole communication networks.

SUMMARY

The invention has been developed in response to the present state of the art and, in particular, in response to the problems and needs in the art that have not yet been fully solved by currently available downhole networks. Accordingly, the invention has been developed to provide systems and methods to build redundancy into downhole networks.

The features and advantages of the invention will become more fully apparent from the following description and appended claims, or may be learned by practice of the invention as set forth hereinafter.

In one aspect of the invention, an annular coupler for transmitting data across a tool joint may include a first coupler segment spanning a first portion of the circumference of the annular coupler. The annular coupler may further include a second coupler segment, electrically insulated from the first coupler segment, which spans a second portion of the circumference of the annular coupler. In selected aspects, the first and second portions do not overlap one another along the circumference. In certain aspects, the first and second coupler segments each span about fifty percent of the circumference of the annular coupler. Thus, each coupler segment may make up roughly half of the annular coupler.

In another aspect, a downhole tool in accordance with the invention may include an annular coupler installed in an end thereof. The annular coupler may include a first coupler segment spanning a first portion of the circumference of the annular coupler and a second coupler segment, electrically insulated from the first coupler segment, spanning a second portion of the circumference of the annular coupler. The first coupler segment may be coupled to a first transmission line to transmit data along the downhole tool. The second coupler segment may be coupled to a second transmission line to transmit data along the downhole tool.

In yet another aspect of the invention, a method for transmitting data across a tool joint may include installing an annular coupler in one of a primary and secondary shoulder of a downhole tool. Installing the annular coupler may include installing a first coupler segment in the primary or secondary shoulder that spans a first portion of the circumference of the annular coupler. Installing the annular coupler may also include installing a second coupler segment in the primary or secondary shoulder that spans a second portion of the circumference of the annular coupler. The first coupler segment may be electrically isolated from the second coupler segment. In selected aspects, the first coupler segment makes up about fifty percent of the circumference of the annular coupler and the second coupler segment makes up about the other fifty percent of the circumference of the annular coupler.

BRIEF DESCRIPTION OF THE DRAWINGS

In order that the advantages of the invention will be readily understood, a more particular description of the invention briefly described above will be rendered by reference to specific aspects illustrated in the appended drawings. Understanding that these drawings depict only typical aspects of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of aspects of apparatus and methods of the present invention, as represented in the Figures, is not intended to limit the scope of the invention, as claimed, but is merely representative of various selected aspects of the invention.

The illustrated aspects of the invention will be best understood by reference to the drawings, wherein like parts are designated by like numerals throughout. Those of ordinary skill in the art will, of course, appreciate that various modifications to the apparatus and methods described herein may be easily made without departing from the essential characteristics of the invention, as described in connection with the Figures. Thus, the following description of the Figures is intended only by way of example, and simply illustrates certain selected aspects consistent with the invention as claimed herein.

Figure 1:
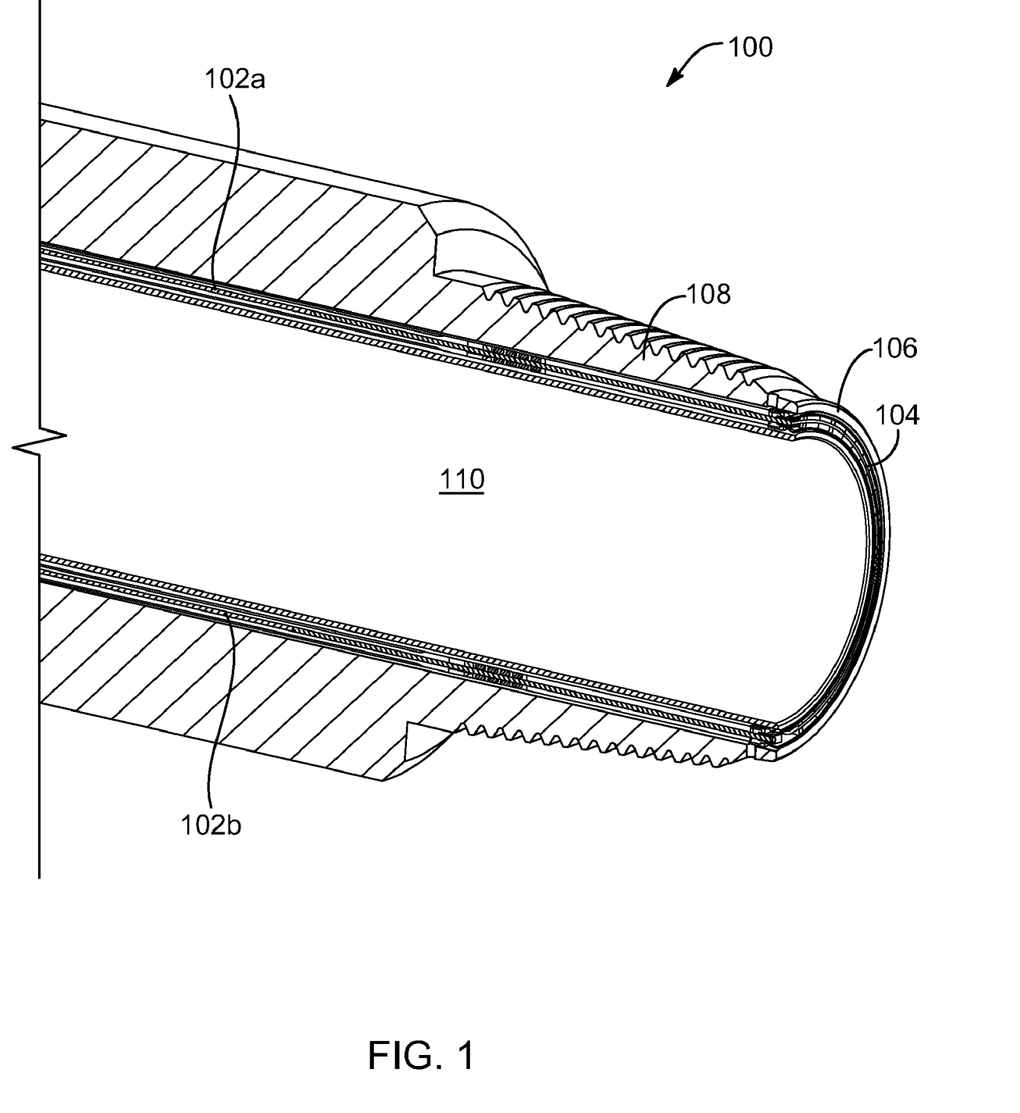
FIG. 1 is a cross-sectional perspective view showing two transmission lines and a split-coil annular coupler incorporated into the pin end of a downhole tool.

FIG. 1 shows a pair of transmission lines 102a, 102b and a split-coil annular coupler 104 incorporated into the pin end 108 of a downhole tool 100. In the illustrated aspect, the downhole tool 100 is a section of drill pipe 100. However, the downhole tool 100 may also include other tubular components such as heavyweight drill pipe, drill collars, crossovers, mud motors, stabilizers, hole openers, sub-assemblies, under-reamers, drilling jars, drilling shock absorbers, network links, downhole measurement tools, or other downhole tools known to those of skill in the art.

The transmission lines 102a, 102b and annular coupler 104 provide multiple redundant paths of communication along the downhole tool 100. Consequently, if communication is lost or interrupted on one transmission line 102a, the other transmission line 102b may still transmit data along the downhole tool 100. Such a configuration may be used to provide multiple paths of communication in a downhole network, one example of which is disclosed in U.S. Pat. No. 7,041,908 to Hall et al. and entitled "Data Transmission System for a Downhole Component," which is herein incorporated by reference in its entirety.

In the illustrated aspect of the invention, the annular coupler 104 is an inductive coupler 104 configured to transmit data across a tool joint as a magnetic signal. Two magnetically coupled annular couplers 104 (as would occur with two annular couplers 104 communicating across the tool joint) create a "transformer," in this case an RF signal transformer. However, in other aspects, the annular coupler 104 may use other methods for transmitting data across the tool joint. For example, the annular coupler 104 may be an acoustic coupler, a fiber optic coupler, or an electrical coupler for communicating or transmitting a signal (i.e., an acoustic, optical, or electrical signal) across the tool joint.

In the illustrated aspect, the pin end 108 of the downhole tool 100 is shown. In this example, the pin end 108 is a double-shouldered design, which has been found to be particularly suitable for implementing an annular coupler 104 in accordance with the invention. One example of a double-shouldered downhole tool is described in U.S. Pat. No. 5,908,212 to Smith et al. and entitled "Ultra High Torque Double Shoulder Tool Joint." Nevertheless, the annular coupler 104 is not limited to double-shouldered tool joints, but may be incorporated into tool joints having a wide variety of different configurations.

As shown, the annular coupler 104 is installed in a groove or recess formed in the secondary shoulder 106 of the pin end 108 of the downhole tool 100. In other aspects, the annular coupler 104 may be installed in a primary shoulder or other mating surface of the downhole tool 100. A corresponding annular coupler (not shown) may be installed in the box end of the downhole tool 100. In selected aspects, the transmission lines 102a, 102b may be routed through holes (e.g., gun-drilled holes) formed in the pin end and box end respectively, since the wall thickness is these areas is typically greater. Where the wall thickness is thinner, such as along the length of the downhole tool 100 between the pin end and box end, the transmission lines 102a, 102b may be routed through the central bore 110 of the downhole tool 100. In selected aspects, the transmission lines 102a, 102b may be held under tension to minimize movement of the transmission lines 102a, 102b within the central bore 110, and to keep the transmission lines 102a, 102b against the wall of the central bore 110.

Figure 2:
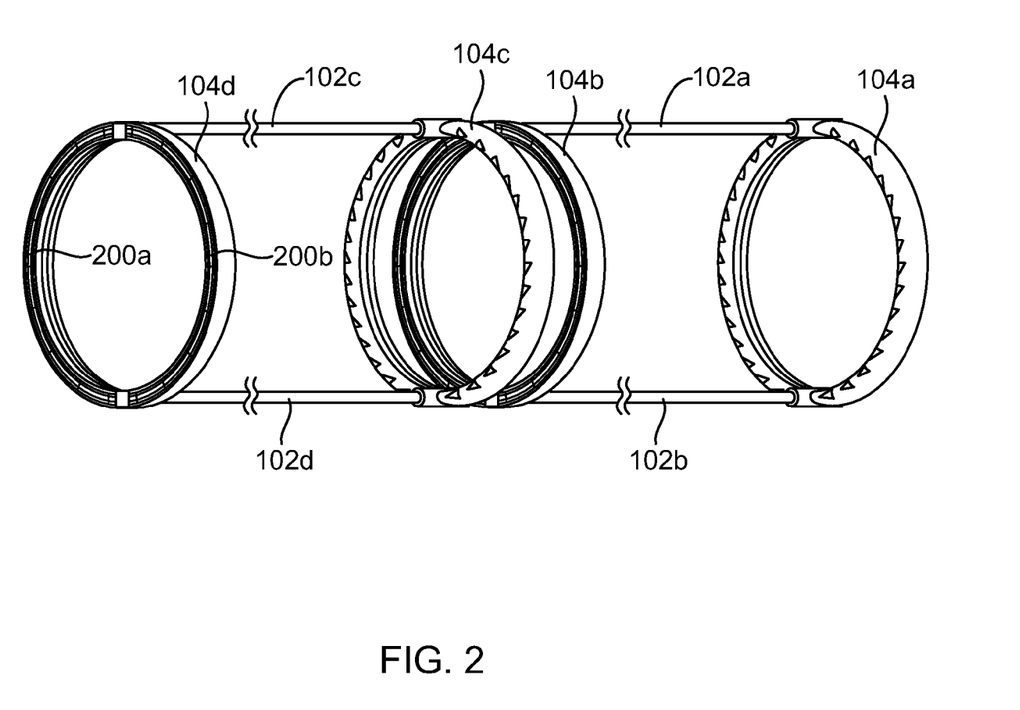
FIG. 2 is a perspective view of multiple annular couplers connected by transmission lines.

Referring to FIG. 2, a perspective view of multiple split-coil annular couplers 104a-d, connected by transmission lines 102a-d, is illustrated. A first set of annular couplers 104a, 104b and transmission lines 102a, 102b may be installed in a first downhole tool, and a second set of annular couplers 104c, 104d and transmission lines 102c, 102d may be installed in a second downhole tool physically coupled to (e.g., threaded into) the first downhole tool. A pair of annular couplers 104b, 104c may communicate with one another across the tool joint.

As shown, a pair of transmission lines 102 may communicate with each annular coupler 104. Each transmission line 102 may communicate with a different electrically-isolated coupler segment 200, as will be explained in more detail hereafter. For example, a first transmission line 102c may communicate with a first coupler segment 200a, and a second transmission line 102d (which is electrically isolated from the first transmission line 102c) may communicate with a second coupler segment 200b (which is electrically isolated from the first coupler segment 200a). In the event one of the couplers segments 200a shorts out or ceases to function for some reason, the other coupler segment 200b and transmission line 102d may continue to function. In this way, redundancy may be built into the downhole network by providing multiple paths of communication through each downhole tool.

One significant advantage of the "split-coil" couplers 104 shown in FIG. 2 is that if a first coupler segment 200a ceases to function, it is not likely to cause the second coupler segment 200b to also cease to function. For example, if the coupler segments 200a, 200b were in close proximity to one another (such as two overlapping segments), a failure of one coupler segment 200a could also cause the failure of the other 200b. For example, a scrap of metal, pebble, or other material that interferes with and shorts out a first coupler segment 200a would also likely short out the other coupler segment 200b since it is in close physical proximity thereto. By dividing the annular coupler 104 into segments 200a, 200b, the segments 200a, 200b may be physically and electrically separated from one another to reduce the chance that a failure of one will cause the failure of the other.

Figure 3:
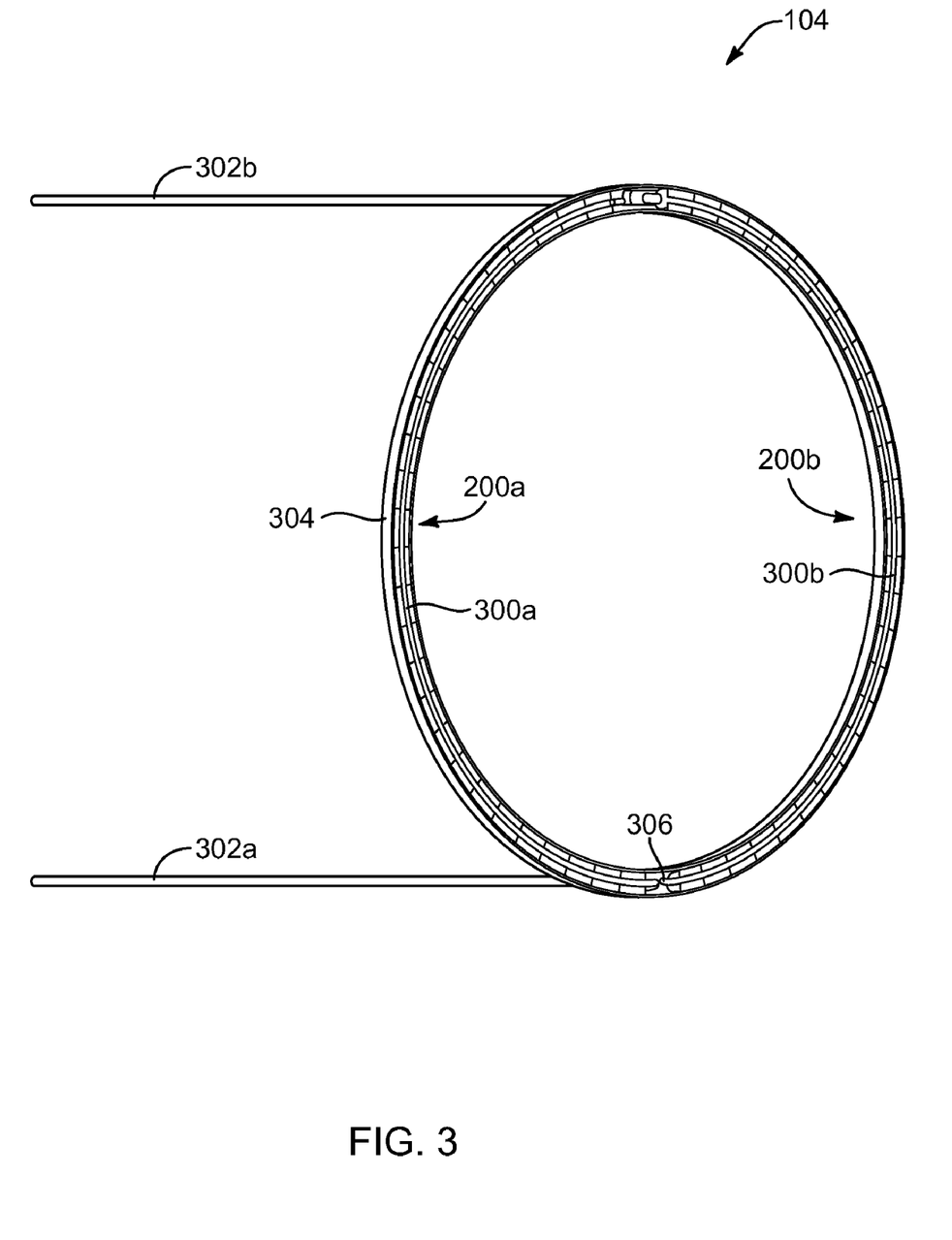
FIG. 3 is perspective view of one aspect of a split-coil annular coupler in accordance with the invention.

Referring to FIG. 3, one aspect of a split-coil annular coupler 104 in accordance with the invention is illustrated. In this aspect, the annular coupler 104 is divided into a pair of coupler segments 200a, 200b, although more coupler segments (and associated transmission lines) are also possible. In this aspect, each coupler segment 200a, 200b makes up about fifty percent of the circumference of the annular coupler 104. Other ratios are possible and within the scope of the invention.

In the illustrated aspect, each coupler segment 200a, 200b includes half of a conductive coil 300a, 300b (i.e., together forming a "split coil"). Each coil 300a, 300b is partially surrounded by magnetically-conductive, electrically-insulating (MCEI) elements, which may be inserted into an annular housing 304. The conductive coils 300a, 300b may be coupled to conductive straight portions 302a, 302b, which may be electrically coupled (by soldering, contact, or other means) to the transmission lines 102. The other ends of the coils 300a, 300b maybe grounded. For example, an end 306 may be grounded by way of soldering, welding, or direct contact with the annular housing 304 (this makes a ½ turn coil that is a complete circuit). The annular housing 304 may be grounded by way of direct contact with the tool 100. In certain aspects, the coils 300a, 300b and straight portions 302a, 302b may be pieces of wire that are bent or formed into the illustrated shapes. In certain aspects, the entire annular coupler 104 is preassembled before being installed in the downhole tool 100.

Figure 4:
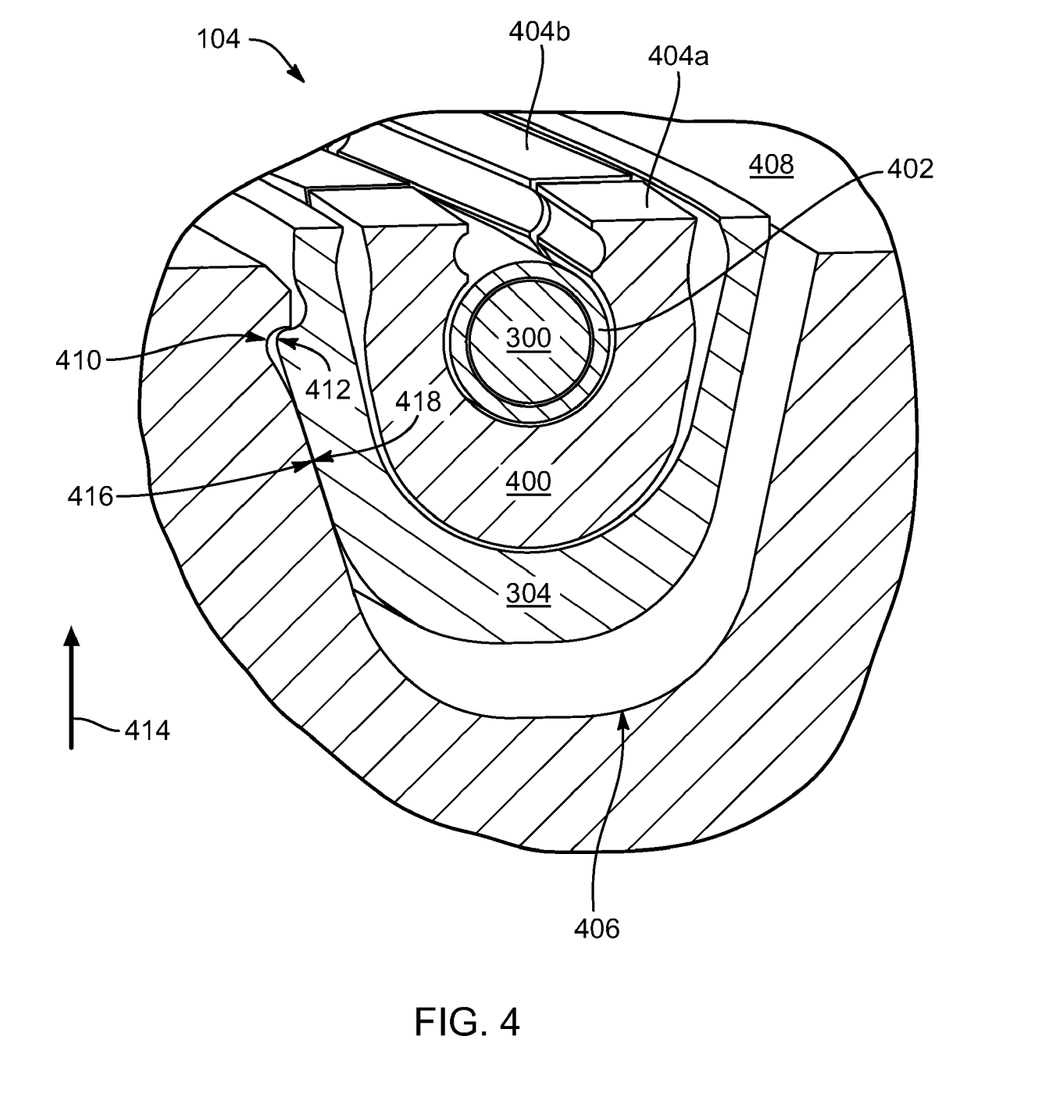
FIG. 4 is a perspective cutaway view of a split-coil annular coupler installed in a mating surface of a downhole tool.

Referring to FIG. 4, a perspective, cross-sectional view of one aspect of a split-coil annular coupler 104 in accordance with the invention is illustrated. In selected aspects, the annular coupler 104 may include an annular housing 304 forming a trough. MCEI elements 400 may be placed within the trough. In certain aspects, the MCEI elements 400 are fabricated from a ferrite material or other material with similar electrical and magnetic properties. Similarly, the MCEI elements 400 may be formed in a U-shape that is sized and shaped to fit within the annular housing 304. The annular housing 304 may provide a durable frame in which to house the relatively fragile MCEI elements 400. The conductive coil 300 may be provided within the U-shaped MCEI elements 400 to carry electrical current. In selected aspects, the conductive coil 300 is coated with an electrically insulating material 402. For example, the conductive coil 300 may be made of copper or silver-plated copper-clad steel, which may be insulated with varnish, enamel, or a polymer. In other aspects, the coil 300 is insulated with a tough, flexible polymer, such as high density polyethylene or polymerized tetrafluoroethane (PTFE).

As current flows through the coil 300, a magnetic flux or field may be created around the coil 300. The U-shaped MCEI elements 400 may contain the magnetic flux created by the coil 300 and prevent energy leakage into surrounding materials. The U-shape of the MCEI elements 400 may also serve to transfer magnetic current to a similarly shaped MCEI element 400 in an adjacent annular coupler 104. Since materials such as ferrites may be quite brittle, the U-shaped MCEI elements 400 may be provided in segments 404a, 404b to prevent cracking or breaking that might occur using a monolithic piece of ferrite. In selected aspects, these segments 404a, 404b may be held together using a resilient material, such as an epoxy, a natural rubber, polytetrafluoroethylene (PTFE), perfluoroalkoxy (PFA), a fiberglass or carbon fiber composite, a polyurethane, or the like.

As was previously discussed, an annular recess 406 may be provided in a mating surface 408 of the downhole tool 100, such as in the secondary shoulder 408 of the downhole tool 100. The recess 406 may be positioned so as to lie substantially equidistant between the inner and outer diameter of the secondary shoulder or face. The annular coupler 104 may be inserted into and retained within the recess 406. In selected aspects, the recess 406 may include a locking mechanism to enable the annular housing 304 to be retained within the recess 406. For example, in one aspect, a locking mechanism may include a groove 410 or recess 410 formed within the larger recess 406. A corresponding shoulder 412 may be formed along the annular housing 304. This shoulder 412 may engage the groove 410, thereby retaining the annular coupler 104 within the recess 406.

In order to close any gaps between annular couplers 104 in the pin end and box end of downhole tools 100 making up a tool joint, an annular coupler 104 may be biased with respect to the mating surface 408. That is, the annular coupler 104 may be urged in a direction 414 with respect to the mating surface 408. In selected aspects, angled surfaces 416, 418 of the recess 406 and the annular housing 304, along with the diameters of the annular housing 304 and the recess 406 may provide a "spring force" in the direction 414. This may be accomplished may making the diameter of the annular housing 304 slightly smaller than the diameter of the recess 406 and then pressing the annular housing 304 into the recess 406 until the shoulder 412 snaps into the groove 410. The top surface of the annular coupler 104 may slit slightly above the mating surface 408, but may travel downward into the recess 406 upon contacting a corresponding annular coupler 104 of an adjacent downhole tool 100. The spring force may keep the annular couplers 104 in firm contact with one another, improving their ability to transmit a signal across the tool joint.

Figure 5:
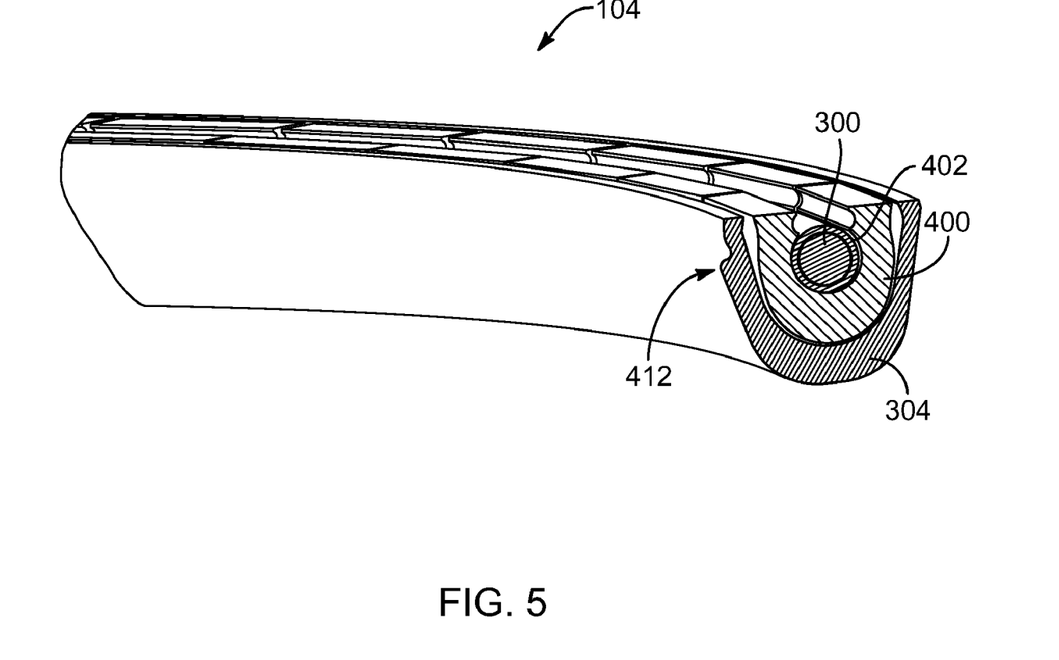
FIG. 5 is a perspective cutaway view of the split-coil annular coupler of FIG. 4.

Referring to FIG. 5, another cutaway view of the split-coil annular coupler 104 of FIG. 4 is illustrated. As shown, the annular coupler 104 includes an annular housing 304, forming a trough, with multiple MCEI elements 400 residing in the trough. The MCEI elements 400 are U-shaped with a size and shape to fit within the annular housing 304. A conductive coil 300 is routed through the U-shaped MCEI elements 400. An electrically insulating material 402 is used to coat the conductive coil 300. A shoulder 412 is formed along the inside diameter of the annular housing 304 to enable the shoulder 412 to engage a corresponding groove 410 in the annular recess of the downhole tool 100.

Figure 6:
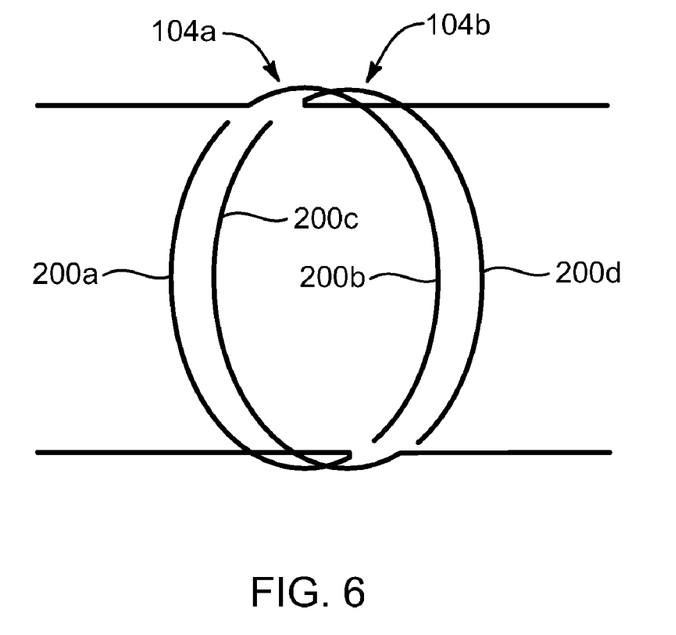
FIG. 6 is a schematic view showing coupler segments rotationally aligned with one another.
Figure 7:
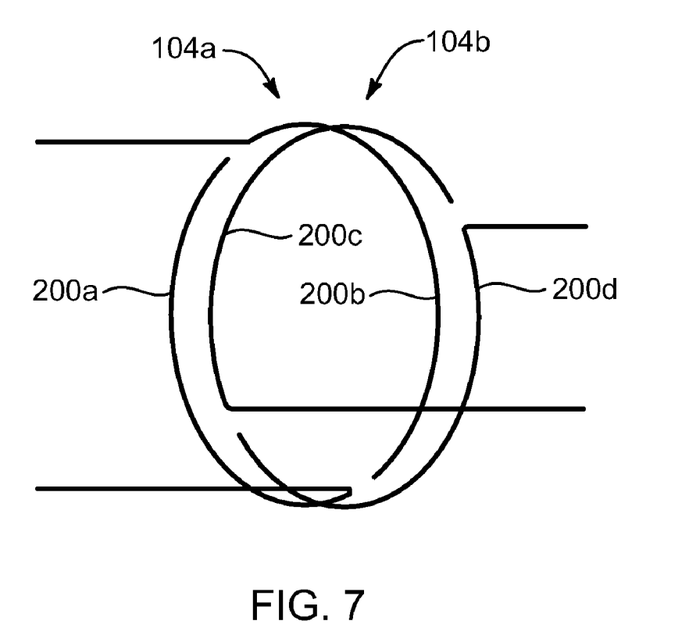
FIG. 7 is a schematic view showing coupler segments rotationally misaligned with one another.

Referring to FIGS. 6 and 7, one advantage of the present invention is that communication may be maintained regardless of the "clocking" of the annular couplers 104. For example, referring to FIG. 6, where the annular couplers 104a, 104b are substantially aligned, a coupler segment 200a of the annular coupler 104a will be aligned with the coupler segment 200c of the annular coupler 104b. Similarly, a coupler segment 200b of the annular coupler 104a will be aligned with the coupler segment 200d of the annular coupler 104b. If one of the coupler segments 200a, 200c loses functionality, communication may nevertheless be maintained between the other coupler segments 200b, 200d. Similarly, if one of the coupler segment 200b, 200d loses functionality, communication may be maintained between the coupler segments 200a, 200c. In this scenario, most if not all of the signal power from the coupler segment 200a will be transmitted to the coupler segment 200c, and most if not all of the signal power from the coupler segment 200b will be transmitted to the coupler segment 200d.

On the other hand, where the annular couplers 104a, 104b are misaligned, the annular couplers 104a, 104b may still maintain communication. For example, referring to FIG. 7, consider a case where a coupler segment 200a of the annular coupler 104a is misaligned with the coupler segment 200c of the annular coupler 104b, and a coupler segment 200b of the annular coupler 104a is misaligned with the coupler segment 200d of the annular coupler 104b. If a coupler segment 200a loses functionality, communication may nevertheless be maintained between the coupler segments 200b, 200d. Communication may also exist between the coupler segment 200b and the coupler segment 200a of the annular coupler 104b. The difference between this scenario and that illustrated in FIG. 6 is that power transmitted from the coupler segment 200b will be split in some proportion between the coupler segments 200a, 200d. Thus, the annular couplers 104a, 104b may maintain communication regardless of the "clocking" between the annular couplers 104a, 104b. In either case (FIG. 6 or 7), a drop in signal power (that would not prevent the network from functioning correctly) could be used as a warning that a tool joint has a failure in one of the two communication paths.

The present invention may be embodied in other specific forms without departing from its essential characteristics. The described aspects are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A set of annular couplers for transmitting data across a tool joint formed by the box end of one downhole tool and the pin end of a second downhole tool, the set of annular couplers comprising:
   a first annular coupler having a circumference and being disposed in an annular recess in a shoulder of the box end;
   wherein the first annular coupler includes:
      a first coupler segment spanning a first portion of the circumference of the first annular coupler; and
      a second coupler segment electrically insulated from the first coupler segment of the first annular coupler and spanning a second portion of the circumference of the first annular coupler;
   a second annular coupler having a circumference and being disposed in an annular recess in a shoulder of the pin end;
   wherein the second annular coupler includes:
      a first coupler segment spanning a first portion of the circumference of the second annular coupler; and
      a second coupler segment electrically insulated from the second coupler segment of the second annular coupler and spanning a second portion of the circumference of the second annular coupler;
   wherein the first annular coupler is biased into engagement with the second annular coupler.

2. The set of annular couplers of claim 1, wherein the first portion of the circumference of the first annular coupler does not overlap the second portion of the circumference of the first annular coupler; and
   wherein the first portion of the circumference of the second annular coupler does not overlap the second portion of the circumference of the second annular coupler.

3. The set of annular couplers of claim 2, wherein the first portion of the circumference of the first annular coupler comprises about fifty percent of the circumference of the first annular coupler and the second portion of the circumference of the first annular coupler comprises about the other fifty percent of the circumference of the first annular coupler.

4. The set of annular couplers of claim 1, wherein the first coupler segment of the first annular coupler is connected to a first transmission line and the second coupler segment of the first annular coupler is connected to a second transmission line; and
   wherein the first coupler segment of the second annular coupler is connected to a third transmission line and the second coupler segment of the second annular coupler is connected to a fourth transmission line.

5. The set of annular couplers of claim 1, wherein the first coupler segment of the first annular coupler is configured to transmit data in the form of magnetic signals to the first coupler segment of the second annular coupler; and
   wherein the second coupler segment of the first annular coupler is configured to transmit data in the form of magnetic signals to the second coupler segment of the second annular coupler.

6. The set of annular couplers of claim 1, wherein the first the first coupler segment of the first annular coupler is configured to transmit data in the form of electrical signals to the first coupler segment of the second annular coupler; and
   wherein the second coupler segment of the first annular coupler is configured to transmit data in the form of electrical signals to the second coupler segment of the second annular coupler.

7. The set of annular couplers of claim 1, wherein the first and second coupler segments of the first annular coupler comprise conductive coils inserted into an electrically-insulating, magnetically conductive material; and
   wherein the first and second coupler segments of the second annular coupler comprise conductive coils inserted into an electrically-insulating, magnetically conductive material.

8. The set of annular couplers of claim 7, wherein the electrically-insulating, magnetically conductive material is a ferrite material.

9. A downhole tool comprising:
   an annular coupler installed in one of a primary and secondary shoulder of the downhole tool, the annular coupler being characterized by a circumference, the annular coupler comprising:
   a first coupler segment spanning a first portion of the circumference of the annular coupler; and
   a second coupler segment, electrically insulated from the first coupler segment, spanning a second portion of the circumference of the annular coupler;
   wherein the first coupler segment is connected to a first transmission line incorporated into the downhole tool and the second coupler segment is connected to a second transmission line incorporated into the downhole tool.

10. The downhole tool of claim 9, wherein the downhole tool is selected from the group consisting of a section of drill pipe, heavyweight drill pipe, a drill collar, a crossover, a mud motor, a stabilizer, a hole opener, a sub-assembly, an under-reamer, a drilling jar, and a drilling shock absorber.

11. The downhole tool of claim 9, wherein the first coupler segment does not overlap the second coupler segment.

12. The downhole tool of claim 11, wherein the first coupler segment comprises about fifty percent of the circumference of the annular coupler and the second coupler segment comprises about the other fifty percent of the circumference of the annular coupler.

13. The downhole tool of claim 9, wherein the first and second coupler segments are configured to transmit data in the form of electrical signals.

14. The downhole tool of claim 9, wherein the first coupler segment and the second coupler segment are each disposed within an annular recess formed in the shoulder in which it is installed.

15. The downhole tool of claim 14, wherein the first coupler segment and the second coupler segment each include a locking shoulder configured to mate with a circumferential groove in the recess of the shoulder in which it is installed.

16. The downhole tool of claim 14, wherein the first coupler segment and the second coupler segment are each configured to at least partially contact a complementary coupler segment in a second downhole tool.

17. The downhole tool of claim 9, wherein the first coupler segment and the second coupler segment are biased away from the shoulder in which it is installed.

18. A downhole tool comprising:
an annular coupler installed in one of a primary and secondary shoulder of the downhole tool, the annular coupler being characterized by a circumference, the annular coupler comprising:
a first coupler segment spanning a first portion of the circumference of the annular coupler; and
a second coupler segment, electrically insulated from the first coupler segment, spanning a second portion of the circumference of the annular coupler;
wherein the first and second coupler segments are configured to transmit data in the form of magnetic signals.

19. The downhole tool of claim 18, wherein the downhole tool is selected from the group consisting of a section of drill pipe, heavyweight drill pipe, a drill collar, a crossover, a mud motor, a stabilizer, a hole opener, a sub-assembly, an underreamer, a drilling jar, and a drilling shock absorber.

20. The downhole tool of claim 18, wherein the first coupler segment does not overlap the second coupler segment.

21. The downhole tool of claim 20, wherein the first coupler segment comprises about fifty percent of the circumference of the annular coupler and the second coupler segment comprises about the other fifty percent of the circumference of the annular coupler.

22. The downhole tool of claim 18, wherein the first coupler segment and the second coupler segment are each disposed within an annular recess formed in the shoulder in which it is installed.

23. The downhole tool of claim 22, wherein the first coupler segment and the second coupler segment each include a locking shoulder configured to mate with a circumferential groove in the recess of the shoulder in which it is installed.

24. The downhole tool of claim 22, wherein the first coupler segment and the second coupler segment are each configured to at least partially contact a complementary coupler segment in a second downhole tool.

25. The downhole tool of claim 18, wherein the first coupler segment and the second coupler segment are biased away from the shoulder in which it is installed.

26. A downhole tool comprising:
an annular coupler installed in one of a primary and secondary shoulder of the downhole tool, the annular coupler being characterized by a circumference, the annular coupler comprising:
a first coupler segment spanning a first portion of the circumference of the annular coupler; and
a second coupler segment, electrically insulated from the first coupler segment, spanning a second portion of the circumference of the annular coupler;
wherein the first and second coupler segments comprise conductive coils inserted into electrically-insulating, magnetically conductive materials.

27. The downhole tool of claim 26, wherein the electrically-insulating, magnetically conductive materials are ferrite materials.

28. The downhole tool of claim 26, wherein the downhole tool is selected from the group consisting of a section of drill pipe, heavyweight drill pipe, a drill collar, a crossover, a mud motor, a stabilizer, a hole opener, a sub-assembly, an underreamer, a drilling jar, and a drilling shock absorber.

29. The downhole tool of claim 26, wherein the first coupler segment does not overlap the second coupler segment.

30. The downhole tool of claim 29, wherein the first coupler segment comprises about fifty percent of the circumference of the annular coupler and the second coupler segment comprises about the other fifty percent of the circumference of the annular coupler.

31. The downhole tool of claim 26, wherein the first coupler segment and the second coupler segment are each disposed within an annular recess formed in the shoulder in which it is installed.

32. The downhole tool of claim 31, wherein the first coupler segment and the second coupler segment each include a locking shoulder configured to mate with a circumferential groove in the recess of the shoulder in which it is installed.

33. The downhole tool of claim 31, wherein the first coupler segment and the second coupler segment are each configured to at least partially contact a complementary coupler segment in a second downhole tool.

34. The downhole tool of claim 26, wherein the first coupler segment and the second coupler segment are biased away from the shoulder in which it is installed.

35. A method for transmitting data across a tool joint, the method comprising:
installing an annular coupler in one of a primary and secondary shoulder of a downhole tool, the annular coupler being characterized by a circumference, wherein installing an annular coupler comprises:
installing a first coupler segment spanning a first portion of the circumference of the annular coupler;
installing a second coupler segment, electrically isolated from the first coupler segment, spanning a second portion of the circumference of the annular coupler; and
connecting the first coupler segment to a first transmission line and the second coupler segment to a second transmission line.

36. The method of claim 35, wherein the first coupler segment comprises about fifty percent of the circumference of the annular coupler and the second coupler segment comprises about the other fifty percent of the circumference of the annular coupler.

* * * * *